(12) United States Patent
Mori et al.

(10) Patent No.: US 10,377,002 B2
(45) Date of Patent: Aug. 13, 2019

(54) MANUFACTURING MACHINE

(71) Applicant: DMG MORI CO., LTD., Yamatokoriyama-shi (JP)

(72) Inventors: Masahiko Mori, Yamatokoriyama (JP); Yuhei Mezawa, Yamatokoriyama (JP); Shigeyuki Takashima, Yamatokoriyama (JP); Shigetsugu Sakai, Yamatokoriyama (JP); Makoto Fujishima, Yamatokoriyama (JP); Eiichiro Gomi, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 0 days.

(21) Appl. No.: 15/576,300

(22) PCT Filed: Apr. 7, 2016

(86) PCT No.: PCT/JP2016/061390
§ 371 (c)(1),
(2) Date: Nov. 22, 2017

(87) PCT Pub. No.: WO2016/189981
PCT Pub. Date: Dec. 1, 2016

(65) Prior Publication Data
US 2018/0141174 A1    May 24, 2018

(30) Foreign Application Priority Data
May 25, 2015    (JP) .................................. 2015-105249

(51) Int. Cl.
*B23K 26/34* (2014.01)
*B23K 26/36* (2014.01)
(Continued)

(52) U.S. Cl.
CPC ............ *B23P 23/04* (2013.01); *B22F 3/1055* (2013.01); *B22F 3/24* (2013.01); *B23K 26/0093* (2013.01);
(Continued)

(58) Field of Classification Search
CPC .......... B23K 10/027; B23K 26/34–342; B23K 26/36; B23P 23/00–06; B33Y 10/00; B33Y 30/00; B33Y 40/00
See application file for complete search history.

(56) References Cited

U.S. PATENT DOCUMENTS 6,314,686 B1 * 11/2001 Scherer .................. B23K 26/12
219/121.21
6,621,091 B2 * 9/2003 Pratt .................. B23K 26/0861
219/121.82

(Continued)

FOREIGN PATENT DOCUMENTS

CN    203599850 U    5/2014
CN    203843168 U    9/2014
(Continued)

OTHER PUBLICATIONS

International Search Report dated May 17, 2016 in PCT/JP2016/061390 filed Apr. 7, 2016.

*Primary Examiner* — Michael A LaFlame, Jr.
(74) *Attorney, Agent, or Firm* — Oblon, McClelland, Maier & Neustadt, L.L.P.

(57) ABSTRACT

A manufacturing machine is capable of subtractive manufacturing and additive manufacturing for a workpiece. The manufacturing machine includes: a first headstock and a second headstock disposed in a first processing area and configured to hold a workpiece; a lower tool rest and a tool spindle disposed in the first processing area and configured to hold a tool to be used for subtractive manufacturing for the workpiece; an additive manufacturing head disposed in
(Continued)

a second processing area; and a robot arm configured to hold a workpiece and transport the workpiece between the first processing area and the second processing area. The additive manufacturing head is configured to discharge a material toward the workpiece held by the robot arm during additive manufacturing for the workpiece. Accordingly, the manufacturing machine configured simply to be capable of subtractive manufacturing and additive manufacturing is provided.

4 Claims, 7 Drawing Sheets

(51) Int. Cl.
| | |
|---|---|
| *B33Y 40/00* | (2015.01) |
| *B23P 23/04* | (2006.01) |
| *B23Q 7/04* | (2006.01) |
| *B33Y 30/00* | (2015.01) |
| *B23K 26/342* | (2014.01) |
| *B22F 3/105* | (2006.01) |
| *B22F 3/24* | (2006.01) |
| *B23K 26/00* | (2014.01) |
| *B23K 26/08* | (2014.01) |
| *B23K 26/12* | (2014.01) |
| *B23K 26/354* | (2014.01) |
| *C22C 1/04* | (2006.01) |
| *B33Y 10/00* | (2015.01) |

(52) U.S. Cl.
CPC ...... *B23K 26/0861* (2013.01); *B23K 26/0884* (2013.01); *B23K 26/123* (2013.01); *B23K 26/34* (2013.01); *B23K 26/342* (2015.10); *B23K 26/354* (2015.10); *B23Q 7/04* (2013.01); *B33Y 30/00* (2014.12); *B33Y 40/00* (2014.12); *B22F 2003/1056* (2013.01); *B22F 2003/1058* (2013.01); *B22F 2999/00* (2013.01); *B33Y 10/00* (2014.12); *C04B 2235/6026* (2013.01); *C22C 1/0408* (2013.01); *Y02P 10/295* (2015.11)

(56) References Cited

U.S. PATENT DOCUMENTS

| | | | |
|---|---|---|---|
| 6,649,868 B2* | 11/2003 | Pratt | B23K 26/12 |
| | | | 219/121.82 |
| 2004/0096586 A1* | 5/2004 | Schulberg | H01L 21/67167 |
| | | | 427/372.2 |
| 2011/0285060 A1* | 11/2011 | Yamamoto | B29C 67/0077 |
| | | | 264/401 |
| 2014/0055825 A1* | 2/2014 | Shigeta | B41C 1/00 |
| | | | 358/3.32 |
| 2014/0319749 A1* | 10/2014 | Youngwerth | B25J 15/0475 |
| | | | 269/56 |
| 2016/0263706 A1* | 9/2016 | Potocki | B23K 37/006 |
| 2017/0136545 A1* | 5/2017 | Yoshimura | B22F 3/24 |

FOREIGN PATENT DOCUMENTS

| | | |
|---|---|---|
| CN | 104384936 A | 3/2015 |
| JP | 2004-314168 A | 11/2004 |
| JP | 2012-206137 A | 10/2012 |

* cited by examiner

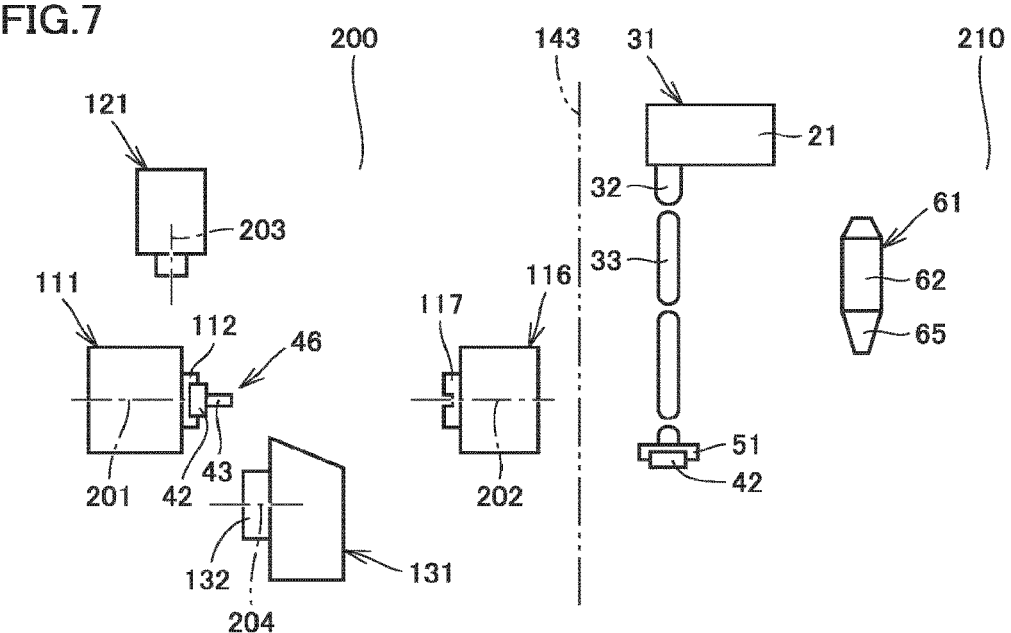
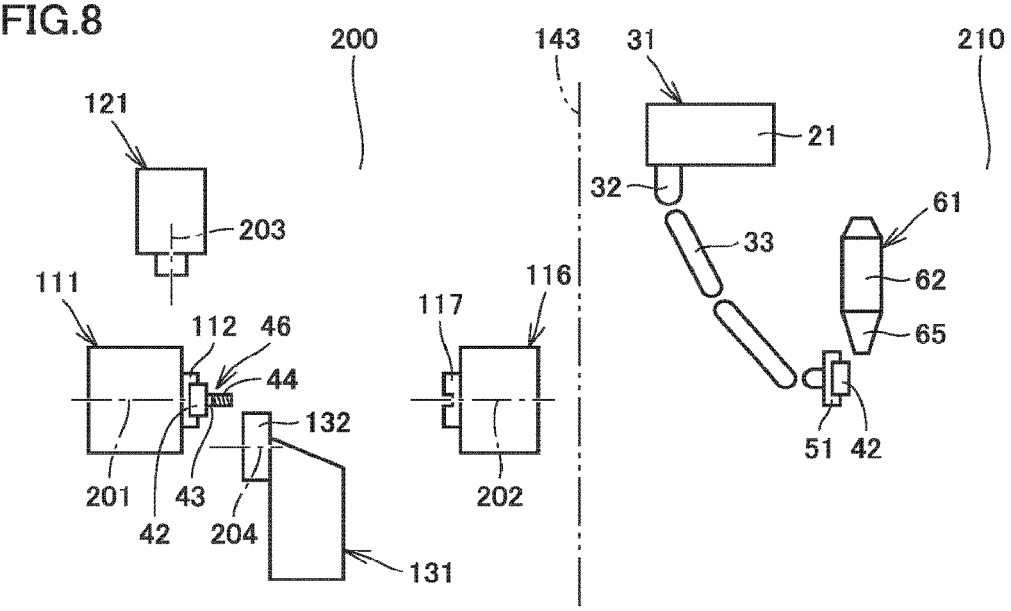

MANUFACTURING MACHINE

TECHNICAL FIELD

The present invention generally relates to manufacturing machines, and more particularly to a manufacturing machine capable of subtractive manufacturing and additive manufacturing for a workpiece.

BACKGROUND ART

Regarding conventional manufacturing machines, Japanese Patent Laying-Open No. 2004-314168 for example discloses a laser cladding apparatus for pump devices with the purpose of fast and accurate cladding without causing cracks in a base material (Patent Document 1). The laser cladding apparatus disclosed in Patent Document 1 includes a powder feeder feeding a metal material (powder) by means of argon gas as a carrier gas, a vortex-type powder feed nozzle uniformly mixing the fed metal material with the argon gas and simultaneously using a gas mixture of argon and nitrogen as a shield gas, and a multi-axis robot moving the vortex-type power feed nozzle.

Japanese Patent Laying-Open No. 2012-206137 discloses a repair apparatus with the purpose of easily performing cladding welding without human labor (Patent Document 2). The repair apparatus disclosed in Patent Document 2 includes a material feeding unit, a laser apparatus emitting a laser spot beam, and a welding robot having a multi-joint arm for moving the laser spot beam in three-dimensional directions.

CITATION LIST

Patent Document

PTD 1: Japanese Patent Laying-Open No. 2004-314168
PTD 2: Japanese Patent Laying-Open No. 2012-206137

SUMMARY OF INVENTION

Technical Problem

Additive manufacturing is a process of creating a three-dimensional shape by depositing materials onto a workpiece. In contrast, subtractive manufacturing is a process of creating a three-dimensional shape from a workpiece by removing materials from the workpiece. The mass of the workpiece has been increased after additive manufacturing, while the mass of the workpiece has been decreased after subtractive manufacturing. The additive and subtractive manufacturing processes are performed in combination in such a manner that takes respective advantages of these processes to produce the final shape of the workpiece.

The above-referenced patent documents disclose a variety of manufacturing machines to be used for additive manufacturing. If a machine tool to be used for subtractive manufacturing and a manufacturing machine to be used for additive manufacturing are installed separately from each other, a high installation cost is necessary. It is therefore required to implement a manufacturing machine configured simply to be capable of subtractive manufacturing and additive manufacturing for a workpiece.

An object of the present invention is therefore to solve the above problem and provide a manufacturing machine configured simply to be capable of subtractive manufacturing and additive manufacturing for a workpiece.

Solution to Problem

A manufacturing machine according to the present invention is capable of subtractive manufacturing and additive manufacturing for a workpiece. The manufacturing machine includes: a workpiece holder disposed in a first processing area and configured to hold a workpiece; a tool holder disposed in the first processing area and configured to hold a tool to be used for subtractive manufacturing for the workpiece; an additive manufacturing head disposed in a second processing area; and a manipulator configured to hold a workpiece and transport the workpiece between the first processing area and the second processing area. The additive manufacturing head is configured to discharge a material toward the workpiece held by the manipulator during additive manufacturing for the workpiece.

Advantageous Effects of Invention

According to the present invention, a manufacturing machine configured simply to be capable of subtractive manufacturing and additive manufacturing for a workpiece can be provided.

BRIEF DESCRIPTION OF DRAWINGS

FIG. 7 is a diagram schematically showing a third step of the manufacturing method for workpieces in the second embodiment of the present invention.
FIG. 8 is a diagram schematically showing a fourth step of the manufacturing method for workpieces in the second embodiment of the present invention.

DESCRIPTION OF EMBODIMENTS

Figure 1:
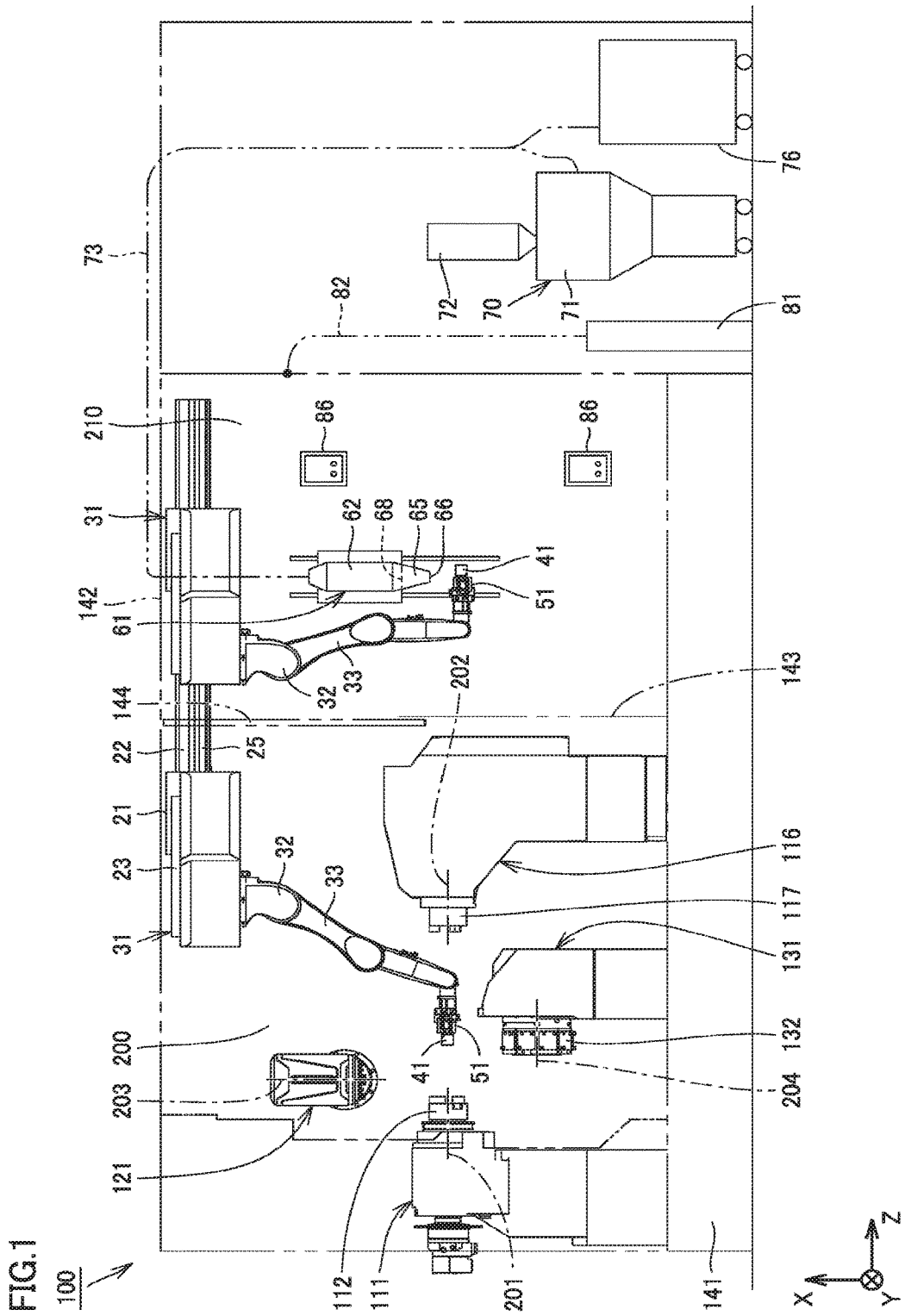
FIG. 1 is a front view showing a manufacturing machine in a first embodiment of the present invention.

Embodiments of the present invention will be described with reference to the drawings. In the drawings referenced below, the same or corresponding members are denoted by the same numerals.

First Embodiment

FIG. 1 is a front view showing a manufacturing machine in a first embodiment of the present invention. In FIG. 1, a cover presenting the appearance of the manufacturing machine is shown as if it is transparent, so that the inside of the manufacturing machine is visible.

Referring to FIG. 1, manufacturing machine 100 is an AM/SM hybrid manufacturing machine capable of additive manufacturing (AM) for a workpiece and subtractive manufacturing (SM) for a workpiece. Manufacturing machine 100 has a turning function performed by means of a stationary tool and a milling function performed by means of a rotary tool, as functions of SM.

Manufacturing machine 100 includes: a bed 141; a first headstock 111, a second headstock 116, a tool spindle 121, and a lower tool rest 131 for subtractive manufacturing for a workpiece; and an additive manufacturing head 61 for additive manufacturing for a workpiece.

Bed 141 is a base member for supporting first headstock 111, second headstock 116, tool spindle 121, lower tool rest 131, and additive manufacturing head 61, and mounted on an installation surface in a factory or the like.

First headstock 111, second headstock 116, tool spindle 121, and lower tool rest 131 are disposed in a first processing area 200. Additive manufacturing head 61 is disposed in a second processing area 210. First processing area 200 and second processing area 210 are located to be adjacent to each other in the direction of a Z axis that extends horizontally.

First headstock 111 and second headstock 116 are provided to face each other in the Z-axis direction. First headstock 111 and second headstock 116 have a first spindle 112 and a second spindle 117, respectively, for rotating a workpiece in a turning process performed by means of a stationary tool. First spindle 112 is provided rotatably about a central axis 201 extending in parallel with the Z axis. Second spindle 117 is provided rotatably about a central axis 202 extending in parallel with the Z axis. First spindle 112 and second spindle 117 are each provided with a chuck mechanism for detachably holding a workpiece.

Second headstock 116 is provided to be movable in the Z-axis direction by any of various feed mechanisms, guide mechanisms, a servo motor, and the like.

Tool spindle (upper tool rest) 121 causes a rotary tool to rotate in a milling process performed by means of the rotary tool. Tool spindle 121 is provided rotatably about a central axis 203 extending in parallel with an X axis that extends vertically. Tool spindle 121 is provided with a clamp mechanism for detachably holding the rotary tool.

Tool spindle 121 is supported above bed 141 through a column or the like (not shown). Tool spindle 121 is provided to be movable, by any of various feed mechanisms, guide mechanisms, a servo motor, and the like provided on the column or the like, in the X-axis direction, a Y-axis direction that extends horizontally and orthogonally to the Z-axis direction, and the Z-axis direction. The position of machining by the rotary tool attached to tool spindle 121 moves three-dimensionally. Further, tool spindle 121 is provided to be swivelable about a central axis extending in parallel with the Y axis.

Additive manufacturing head 61 performs additive manufacturing by discharging material powder toward a workpiece and emitting a laser beam toward the workpiece (Directed Energy Deposition).

Additive manufacturing head 61 includes a main body 62 and a laser beam emission part 65. Main body 62 houses elements such as collimation lens and reflection mirror for directing an externally introduced laser beam toward laser beam emission part 65. In laser beam emission part 65, an opening 66 is formed, and the laser beam is emitted and the material powder is discharged through opening 66.

Additive manufacturing head 61 is provided to be movable in the X-axis direction by any of various feed mechanisms, guide mechanisms, a servo motor, and the like. Additive manufacturing head 61 is not limited to the one configured in this manner, but may be provided to be stationary in second processing area 210, or provided to be movable in any axial direction other than the X-axis direction. Additive manufacturing head 61 may have a swivel mechanism and may be provided to be swivelable about a central axis extending in parallel with the Y axis, for example.

Manufacturing machine 100 further includes a material powder feeder 70, a laser oscillator 76, and a tube member 73. Material powder feeder 70 feeds material powder to be used for additive manufacturing toward additive manufacturing head 61. Material powder feeder 70 includes a material powder tank 72 for storing material powder to be used for additive manufacturing, and a mixing unit 71 for mixing the material powder with carrier gas.

Laser oscillator 76 generates a laser beam to be used for additive manufacturing. Tube member 73 is routed from material powder feeder 70 and laser oscillator 76 to additive manufacturing head 61. Tube member 73 houses an optical fiber for directing the laser beam from laser oscillator 76 toward additive manufacturing head 61, and a pipe for directing the material powder supplied from material powder feeder 70 toward additive manufacturing head 61.

For the directed energy deposition for performing additive manufacturing by discharging material powder to a workpiece, the processing area is required to be an inert gas ambient. Manufacturing machine 100 therefore further includes an inert gas tank 81 and a pipe 82 as an inert gas feeder configured to feed an inert gas to second processing area 210.

Inert gas tank 81 stores an inert gas such as argon or nitrogen. Pipe 82 is routed from inert gas tank 81 toward second processing area 210. The inert gas stored in inert gas tank 81 is supplied through pipe 82 to second processing area 210. Second processing area 210 is equipped with an oxygen concentration detection sensor 86 for detecting the oxygen concentration in the area.

Manufacturing machine 100 includes a cover 142. Cover 142 defines each of first processing area 200 and second processing area 210. Cover 142 is made up of a combination of multiple metal sheets and seal members.

Cover 142 includes a partition 143 separating first processing area 200 and second processing area 210 from each other. Partition 143 is disposed opposite to first headstock 111 with respect to second headstock 116. Partition 143 is equipped with an openable/closable shutter 144 for allowing a robot arm 31 described later herein to move.

Cover 142 is provided to define second processing area 210 as a substantially sealed space. The degree of sealing of second processing area 210 defined by cover 142 is higher than the degree of sealing of first processing area 200 defined by cover 142.

In this way, leakage of the inert gas from second processing area 210 or inflow of the outside air containing oxygen into second processing area 210 can be suppressed to more reliably maintain an inert gas ambient in the second processing area 210 during additive manufacturing for a workpiece. In first processing area 200 where subtractive manufacturing is performed, chips and cutting oil have to be discharged to the outside of the machine, and therefore, it is difficult to configure first processing area 200 as a space with a high degree of sealing. In the present embodiment, subtractive manufacturing and additive manufacturing are performed in respective processing areas separated by partition 143, and therefore, second processing area 210 can be defined as a space with a high degree of sealing.

Figure 2:
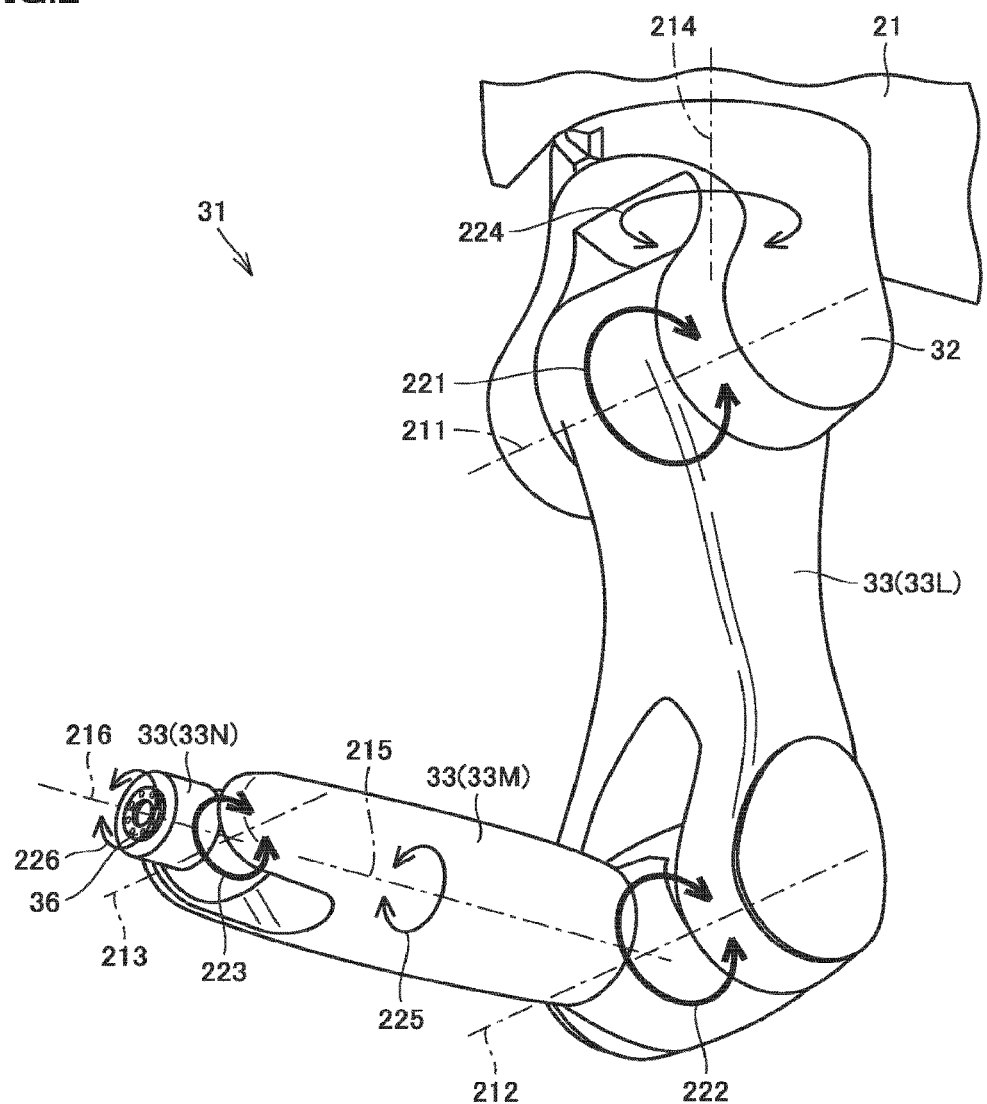
FIG. 2 is a perspective view showing a robot arm of the manufacturing machine in FIG. 1.

FIG. 2 is a perspective view showing a robot arm of the manufacturing machine in FIG. 1. Referring to FIGS. 1 and 2, manufacturing machine 100 further includes robot arm 31. Robot arm 31 holds a workpiece and transports the workpiece between first processing area 200 and second processing area 210.

Robot arm 31 includes a movement mechanism 21, a base 32 supported by movement mechanism 21, an arm 33 pivotably coupled to base 32, and a workpiece gripper 51 detachably gripping a workpiece. Six axes of the robot arm are controllable independently of one another.

Movement mechanism 21 is configured to be movable between first processing area 200 and second processing area 210. Movement mechanism 21 includes a mechanism for linearly reciprocating robot arm 31, and this mechanism includes a base member 23, a linear guide 22, a rack and pinion 25, and a servo motor (not shown).

While robot arm 31 described in connection with the present embodiment is a robot arm whose six axes are controllable, the robot arm may be any robot arm whose multiple axes other than six axes are controllable. Moreover, while robot arm 31 in the present embodiment has a linear motion mechanism (movement mechanism 21), the robot arm may not have such a linear motion mechanism as long as robot arm 31 is capable of transporting a workpiece between first processing area 200 and second processing area 210. For example, the robot arm may be configured to be swivelable about a rotational axis extending in parallel with the X axis. Alternatively, the robot arm may be configured to have only linear motion mechanisms for multiple axes (typically three axes).

Manufacturing machine 100 may further include a workpiece stocker that can store workpieces. In this case, the robot arm may be configured to transport workpieces to/from a subtractive manufacturing position, to/from an additive manufacturing position, and to/from the workpiece stocker.

Figure 3:
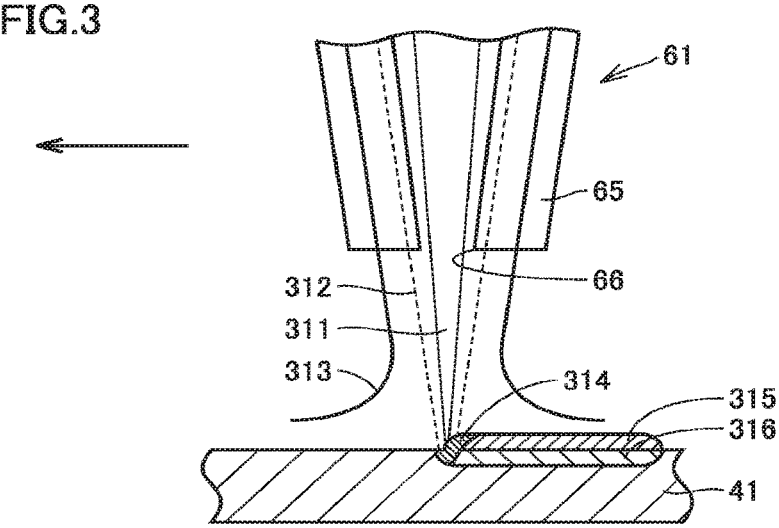
FIG. 3 is an enlarged cross-sectional view of a surface of a workpiece during additive manufacturing.

FIG. 3 is an enlarged cross-sectional view of a surface of a workpiece during additive manufacturing. Referring to FIGS. 1 to 3, additive manufacturing head 61 discharges a material toward a workpiece gripped by robot arm 31 during additive manufacturing for the workpiece.

More specifically, a workpiece 41 is gripped by workpiece gripper 51 during additive manufacturing for the workpiece. Robot arm 31 is activated to cause gripped workpiece 41 to approach additive manufacturing head 61. Robot arm 31 is activated and/or additive manufacturing head 61 is moved to cause additive manufacturing head 61 and workpiece 41 to move relative to each other with opening 66 kept facing the surface of workpiece 41. At this time, a laser beam 311, material powder 312, and shield-and-carrier gas 313 are discharged from opening 66 of additive manufacturing head 61 toward workpiece 41. Accordingly, a melt spot 314 is formed in the surface of workpiece 41 and consequently material powder 312 is melted and deposited.

Specifically, a cladding layer 316 is formed in the surface of workpiece 41. On cladding layer 316, a cladding material 315 is deposited. Cladding material 315 is cooled into a machinable layer formed on the surface of workpiece 41. Instead of laser beam 311, an electron beam may be used. As the material powder, metal powder of aluminum alloy, magnesium alloy, or the like, or ceramic powder may be used.

In such a configuration, during additive manufacturing for a workpiece, the workpiece is gripped by robot arm 31 configured to transport a workpiece. It is therefore unnecessary to separately provide, in second processing area 210, a mechanism for holding a workpiece. Accordingly, manufacturing machine 100 can be configured simply to be capable of subtractive manufacturing and additive manufacturing for a workpiece.

The above-described structure of manufacturing machine 100 in the first embodiment of the present invention is now summarized. Manufacturing machine 100 in the present embodiment is capable of subtractive manufacturing and additive manufacturing for a workpiece. Manufacturing machine 100 includes: first headstock 111 and second headstock 116 disposed in first processing area 200 for serving as a workpiece holder holding a workpiece; lower tool rest 131 and tool spindle 121 disposed in first processing area 200 for serving as a tool holder holding a tool to be used for subtractive manufacturing for a workpiece; additive manufacturing head 61 disposed in second processing area 210; and robot arm 31 serving as a manipulator configured to hold a workpiece and transport the workpiece between first processing area 200 and second processing area 210. Additive manufacturing head 61 discharges a material toward the workpiece held by robot arm 31 during additive manufacturing for the workpiece.

Manufacturing machine 100 in the first embodiment of the present invention configured in the above-described manner can implement the manufacturing machine configured simply to be capable of subtractive manufacturing and additive manufacturing for a workpiece.

While the above description regarding the present embodiment is of the AM/SM hybrid manufacturing machine configured on the basis of a multi-functional manufacturing machine having both a turning function and a milling function, the configuration is not limited to this. Specifically, an AM/SM hybrid manufacturing machine may be configured based on a lathe having a turning function or a machining center having a milling function. When the AM/SM hybrid manufacturing machine is configured based on the machining center, a table is used as a workpiece holder for holding a workpiece within the first processing area.

Additive manufacturing to be performed by manufacturing machine 100 is not limited to the aforementioned directed energy deposition, and may for example be material extrusion by which a molten thermoplastic resin is deposited on a workpiece to produce a three-dimensional shape, or powder bed fusion by which heat is applied to selectively fuse and harden the powder bed around a surface of the powder bed and thereby form a layer.

Second Embodiment

In connection with the present embodiment, a description is given of a manufacturing method for performing additive manufacturing and subtractive manufacturing on a workpiece using manufacturing machine 100 in the first embodiment.

Figure 4:
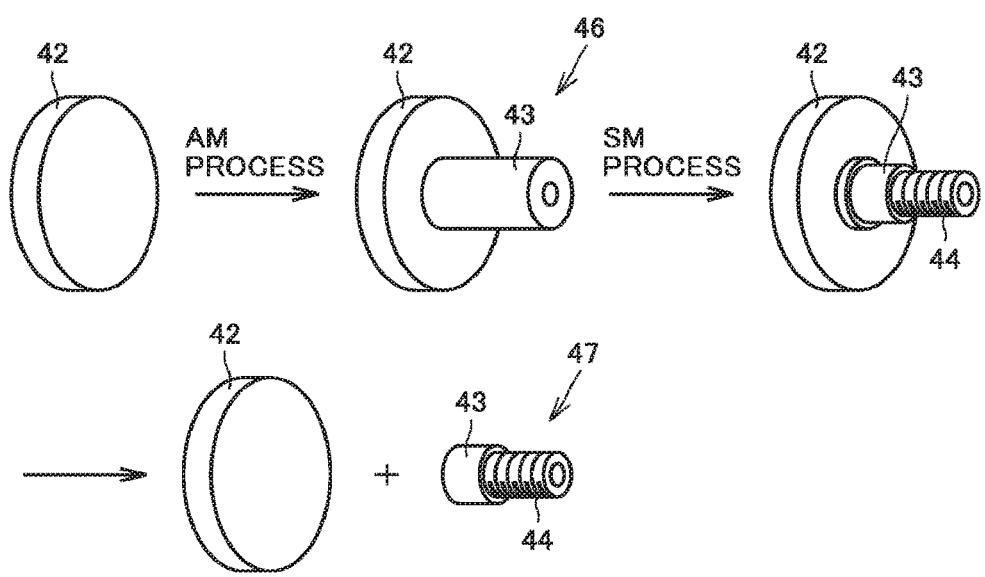
FIG. 4 is a diagram showing a shape of a workpiece changed through additive manufacturing and subtractive manufacturing.

FIG. 4 is a diagram showing a shape of a workpiece changed through additive manufacturing and subtractive manufacturing. Referring to FIG. 4, a base material 42 is prepared first. Base material 42 has a disc shape. Next, additive manufacturing is performed to produce an intermediate product 46 made up of base material 42 and a cladding portion 43 formed on an end face of base material 42. Cladding portion 43 has a cylindrical shape. Next, subtractive manufacturing is performed to form a threaded portion 44 on the outer peripheral surface of cladding portion 43. Finally, base material 42 is separated from cladding portion 43 to produce a final product 47 including threaded portion 44 formed thereon.

FIGS. 5 to 10 are diagrams each schematically showing a step of the manufacturing method for workpieces in the second embodiment of the present invention.

Figure 5:
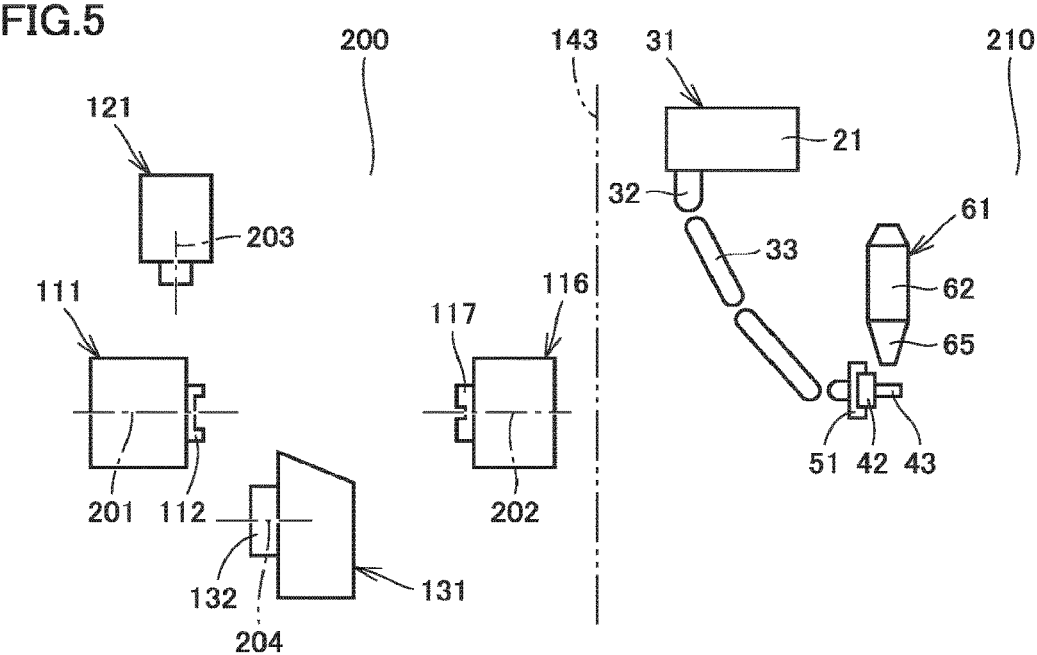
FIG. 5 is a diagram schematically showing a first step of a manufacturing method for workpieces in a second embodiment of the present invention.

Referring to FIG. 5, in second processing area 210, base material 42 is gripped by workpiece gripper 51. Robot arm 31 is activated to cause gripped workpiece 41 to approach additive manufacturing head 61. Material powder is discharged from additive manufacturing head 61 toward base material 42 and meanwhile, a laser beam is applied from additive manufacturing head 61 toward base material 42 to thereby form cladding portion 43 on base material 42 (manufacture of intermediate product 46).

Figure 6:
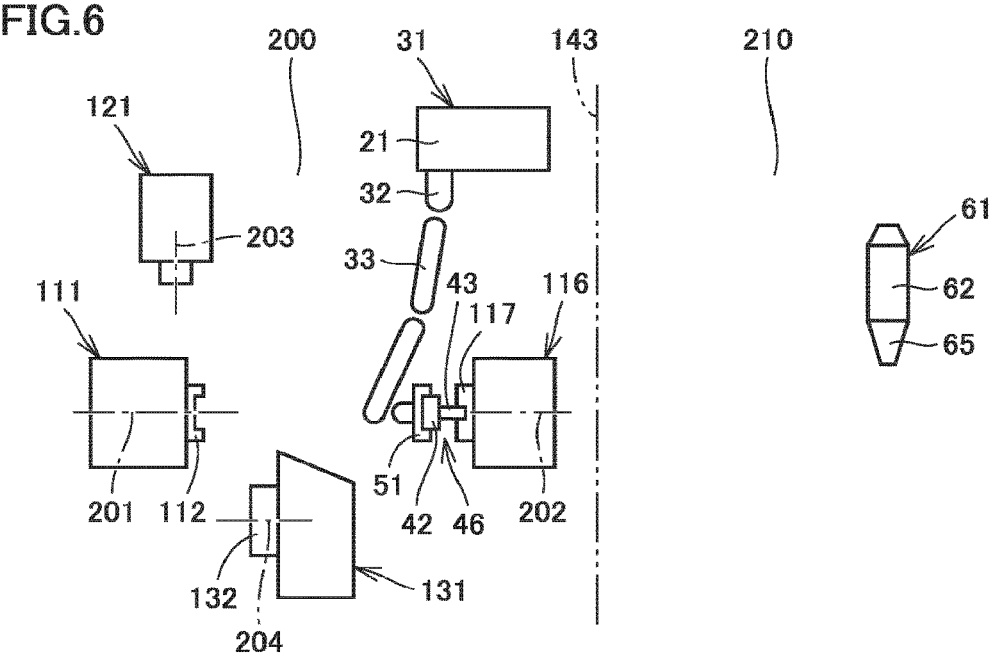
FIG. 6 is a diagram schematically showing a second step of the manufacturing method for workpieces in the second embodiment of the present invention.

Referring to FIG. 6, robot arm 31 is then moved from second processing area 210 into first processing area 200. Robot arm 31 is activated to cause intermediate product 46 held by robot arm 31 to approach second headstock 116. Once cladding portion 43 is placed at a predetermined position with respect to second spindle 117, cladding portion 43 is held by second spindle 117 by chucking. At the timing when cladding portion 43 is held by chucking, base material 42 is ungripped from workpiece gripper 51. Robot arm 31 is withdrawn from first processing area 200 into second processing area 210.

Referring to FIG. 7, in first processing area 200, first headstock 111 and second headstock 116 are caused to approach each other. Base material 42 is held by chucking on first spindle 112 and chucking of cladding portion 43 on second spindle 117 is released to move intermediate product 46 from second headstock 116 to first headstock 111. Meanwhile, in second processing area 210, a new base member 42 is gripped by workpiece gripper 51.

Referring to FIG. 8, in first processing area 200, subtractive manufacturing for forming a threaded portion 44 on cladding portion 43 is started. Meanwhile, in second processing area 210, additive manufacturing for forming cladding portion 43 on base material 42 is started.

In manufacturing machine 100 in the present embodiment, subtractive manufacturing in first processing area 200 and additive manufacturing in second processing area 210 can be carried out simultaneously. During subtractive manufacturing, first processing area 200 is in an atmosphere of cutting oil. In the present embodiment, additive manufacturing head 61 is in second processing area 210 during subtractive manufacturing. It is therefore possible to prevent additive manufacturing head 61 including optical elements from being exposed to cutting oil.

Figure 9:
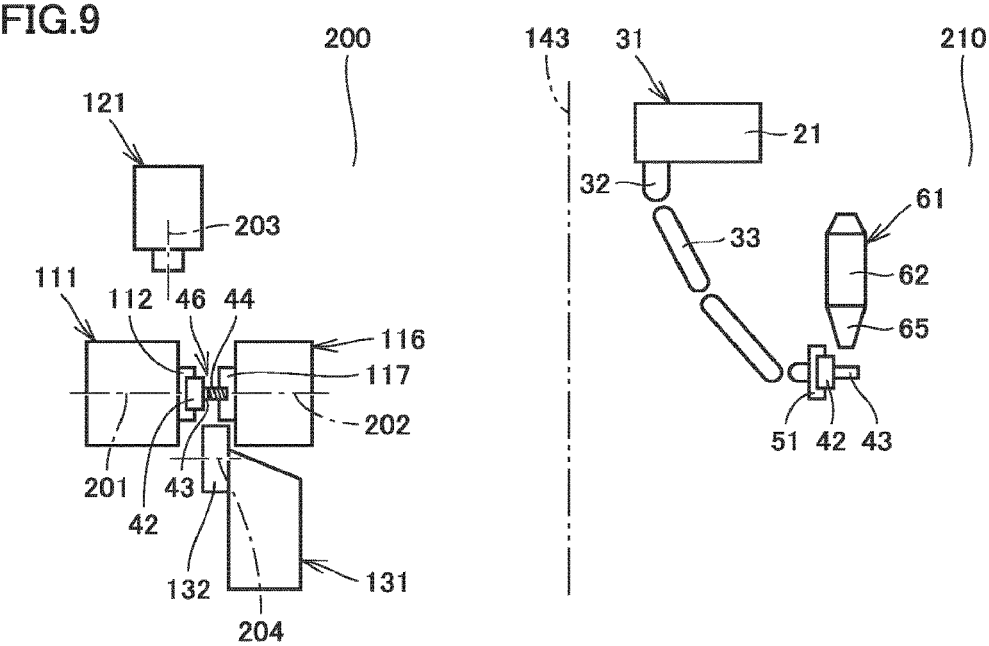
FIG. 9 is a diagram schematically showing a fifth step of the manufacturing method for workpieces in the second embodiment of the present invention.

Referring to FIG. 9, first headstock 111 and second headstock 116 are caused to approach each other while respective rotations of first spindle 112 and second spindle 117 are synchronized with each other. An end of cladding portion 43 of intermediate product 46 is held by chucking. With the opposite ends of intermediate product 46 held by first headstock 111 and second headstock 116, subtractive manufacturing (cut-off machining) is performed for separating base material 42 from cladding portion 43.

Figure 10:
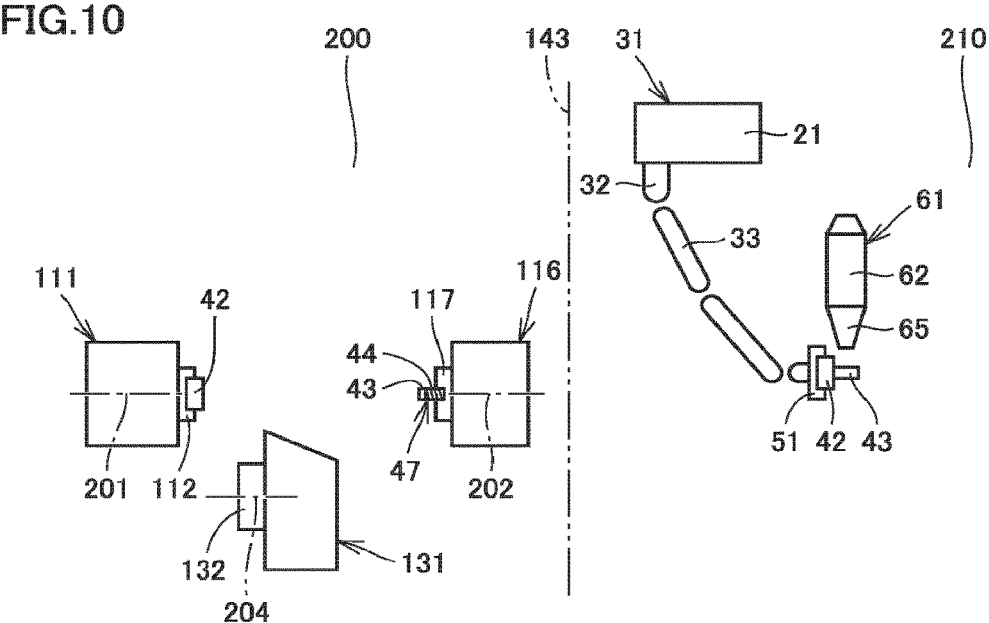
FIG. 10 is a diagram schematically showing a sixth step of the manufacturing method for workpieces in the second embodiment of the present invention.

Referring to FIG. 10, base material 42 is left on first headstock 111 and a final product 47 is left on second headstock 116. From first processing area 200, base material 42 and final product 47 are removed.

Manufacturing machine 100 and the manufacturing method in the second embodiment of the present invention can similarly produce the effects described above in connection with the first embodiment.

Third Embodiment

Figure 11:
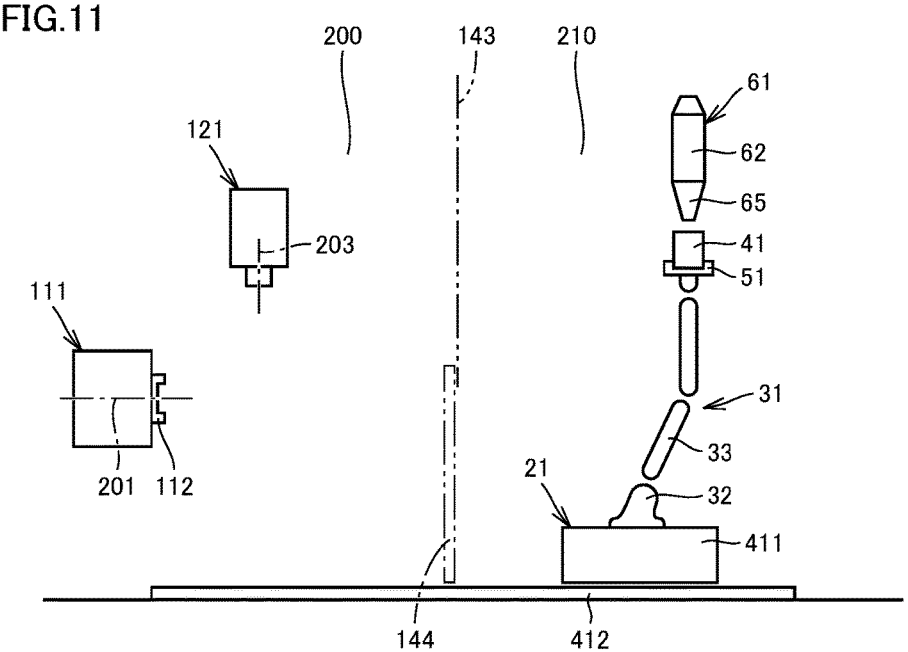
FIG. 11 is a front view schematically showing a manufacturing machine in a third embodiment of the present invention.

FIG. 11 is a front view schematically showing a manufacturing machine in a third embodiment of the present invention. Basically, the manufacturing machine in the present embodiment is structured similarly to manufacturing machine 100 in the first embodiment. In the following, the description of the common structure is not repeated.

Referring to FIG. 11, in the manufacturing machine in the present embodiment, movement mechanism 21 of robot arm 31 includes a wagon 411 and a rail 412. Rail 412 extends linearly between first processing area 200 and second processing area 210. Rail 412 is provided on the bottom of first processing area 200 and second processing area 210. Wagon 411 is provided to be capable of running on rail 412.

Base 32 has a shape protruding vertically upward from movement mechanism 21 (wagon 411). The structure of an arm 33 extending in the shape of an arm from base 32 is similar to that of manufacturing machine 100 in the first embodiment. In the present embodiment, shutter 144 is disposed at a position near the bottom of first processing area 200 and second processing area 210 so as to meet the height where robot arm 31 is moved.

The manufacturing machine in the third embodiment of the present invention configured in the above-described manner can also produce the effects described above regarding the first embodiment.

A manufacturing machine according to the present invention is capable of subtractive manufacturing and additive manufacturing for a workpiece. The manufacturing machine includes: a workpiece holder disposed in a first processing area and configured to hold a workpiece; a tool holder disposed in the first processing area and configured to hold a tool to be used for subtractive manufacturing for the workpiece; an additive manufacturing head disposed in a second processing area; and a manipulator configured to hold a workpiece and transport the workpiece between the first processing area and the second processing area. The additive manufacturing head is configured to discharge a material toward the workpiece held by the manipulator during additive manufacturing for the workpiece.

In the manufacturing machine configured in this way, a material is discharged, during additive manufacturing for a workpiece, toward the workpiece held by the manipulator which is configured to transport the workpiece. It is therefore unnecessary to separately provide, in the second processing area, a mechanism for holding a workpiece. Accordingly, the manufacturing machine configured simply to be capable of subtractive manufacturing and additive manufacturing for a workpiece can be implemented.

Preferably, the manufacturing machine further includes: an inert gas feeder configured to feed an inert gas to the second processing area; and a cover including a partition separating the first processing area and the second processing area from each other and defining the second processing area as a substantially sealed space.

In the manufacturing machine configured in this way, leakage of an inert gas from the second processing area can be suppressed to more reliably maintain the inert gas ambient in the second processing area during additive manufacturing for a workpiece.

Preferably, the manipulator is a robot arm whose multiple axes are controllable, and the robot arm includes a movement mechanism configured to be movable between the first processing area and the second processing area.

In the manufacturing machine configured in this way, the relative positional relation between a workpiece held by the robot arm and the additive manufacturing head can be changed freely during additive manufacturing for the workpiece.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to AM/SM hybrid manufacturing machines capable of subtractive manufacturing and additive manufacturing for a workpiece.

REFERENCE SIGNS LIST 21 movement mechanism; 22 linear guide; 23 base member; 25 rack and pinion; 31 robot arm; 32 base; 33 arm; 33L first movable unit; 33M second movable unit; 33N third movable unit; 36 coupling part; 41 workpiece; 42 base material; 43 cladding portion; 44 threaded portion; 46 intermediate product; 47 final product; 51 workpiece gripper; 61 additive manufacturing head; 62 main body; 65 laser beam emission part; 66 opening; 68 optical element; 70 material powder feeder; 71 mixing unit; 72 material powder tank; 73 tube member; 76 laser oscillator; 81 inert gas tank; 82 pipe; 86 oxygen concentration detection sensor; 100 manufacturing machine; 111 first headstock; 112 first spindle; 116 second headstock; 117 second spindle; 121 tool spindle; 131 lower tool rest; 132 swivel unit; 141 bed; 142 cover; 143 partition; 144 shutter; 200 first processing area; 201, 202, 203, 204 central axis; 210 second processing area; 211, 212, 213 pivot axis; 214, 215, 216 rotation axis; 311 laser beam; 312 material powder; 313 gas; 314 melt spot; 315 cladding material; 316 cladding layer; 411 wagon; 412 rail

The invention claimed is:

1. A manufacturing machine capable of subtractive manufacturing and additive manufacturing for a workpiece, the manufacturing machine comprising:
a cover defining each of a first processing area and a second processing area;
a workpiece holder disposed in the first processing area and configured to hold a workpiece;
a tool holder disposed in the first processing area and configured to hold a tool to be used for subtractive manufacturing for the workpiece;
an additive manufacturing head disposed in the second processing area; and
a manipulator configured to hold a workpiece and transport the workpiece between the first processing area and the second processing area,
the cover including a partition separating the first processing area and the second processing area from each other,
the additive manufacturing head being configured to discharge a material toward the workpiece held by the manipulator during additive manufacturing for the workpiece,
the workpiece holder being configured to hold the workpiece in only the first processing area of the first processing area and the second processing area,
during subtractive manufacturing for the workpiece, the workpiece holder holding the workpiece in the first processing area and the manipulator being withdrawn from the first processing area into the second processing area, and
during additive manufacturing for the workpiece, the workpiece holder being positioned in the first processing area and the manipulator holding the workpiece in the second processing area.

2. The manufacturing machine according to claim 1, further comprising:
an inert gas feeder configured to feed an inert gas to the second processing area
wherein the cover defines the second processing area as a substantially sealed space.

3. The manufacturing machine according to claim 1, wherein
the manipulator is a robot arm having multiple axes that are controllable, the robot arm including a movement mechanism configured to be movable between the first processing area and the second processing area.

4. The manufacturing machine according to claim 2, wherein
the manipulator is a robot arm having multiple axes that are controllable, the robot arm including a movement mechanism configured to be movable between the first processing area and the second processing area.

* * * * *